US012085881B2

(12) United States Patent
Ishikawa

(10) Patent No.: US 12,085,881 B2
(45) Date of Patent: Sep. 10, 2024

(54) IMAGE FORMING APPARATUS FOR CONVEYING A RECORDING MATERIAL TO PERFORM AN IMAGE FORMING OPERATION

(71) Applicant: CANON KABUSHIKI KAISHA, Tokyo (JP)

(72) Inventor: Shimpei Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/556,797

(22) Filed: Dec. 20, 2021

(65) Prior Publication Data

US 2022/0197205 A1 Jun. 23, 2022

(30) Foreign Application Priority Data

Dec. 21, 2020 (JP) ................................ 2020-211243

(51) Int. Cl.
*G03G 15/00* (2006.01)
*B41J 11/00* (2006.01)

(52) U.S. Cl.
CPC ...... *G03G 15/5029* (2013.01); *B41J 11/0095* (2013.01); *G03G 15/5008* (2013.01)

(58) Field of Classification Search
CPC ..... B41J 11/003; B41J 11/009; B41J 11/0095; B41J 29/38; B41J 13/0027; B41J 11/0025; B41J 13/00; B41J 29/393; B41J 13/0009; G03G 2215/00734; G03G 15/5029; G03G 15/50; G03G 15/5008
See application file for complete search history.

(56) References Cited

U.S. PATENT DOCUMENTS

2010/0232818 A1* 9/2010 Kunii ................. G03G 15/2039 399/45
2017/0115622 A1* 4/2017 Okayasu ............ G03G 21/0064
2019/0196381 A1* 6/2019 Igo ....................... G03G 15/553

FOREIGN PATENT DOCUMENTS

JP 2006260185 A 9/2006
JP 2009265286 A 11/2009
JP 2010122702 A 6/2010
JP 2017223903 A 12/2017

* cited by examiner

*Primary Examiner* — Jannelle M Lebron
(74) *Attorney, Agent, or Firm* — Canon U.S.A., Inc. IP Division

(57) ABSTRACT

An image forming apparatus including: a container unit configured to contain a recording material; an image forming unit configured to perform image formation onto the recording material conveyed from the container unit; a control unit configured to perform a preparatory operation for the image formation at an image forming speed before the image forming unit performs the image formation onto the recording material; and a first detection unit configured to detect a size of the recording material contained in the container unit, wherein the control unit is configured to judge whether to execute the preparatory operation based on the size of the recording material detected by the first detection unit.

7 Claims, 14 Drawing Sheets

IMAGE FORMING APPARATUS FOR CONVEYING A RECORDING MATERIAL TO PERFORM AN IMAGE FORMING OPERATION

BACKGROUND

Field of the Disclosure

The present disclosure relates to an image forming apparatus, and relates to, for example, judgment on execution of an image formation preparatory operation of an image forming apparatus for conveying a recording material to perform an image forming operation.

Description of the Related Art

There has been known a technology in which, in an image forming apparatus, an image formation preparatory instruction is given prior to an image forming instruction. In Japanese Patent Application Laid-Open No. 2006-260185, there is disclosed a technology in which a part of an operation required for image formation is executed in advance to reduce the operation to be performed after the image forming instruction is given, to thereby reduce a first print out time (hereinafter abbreviated as "FPOT").

However, in an image forming apparatus having a plurality of image forming speeds depending on recording materials, in some cases, an image forming speed determined at the timing of the image forming instruction and an image forming speed at which the preparatory operation is performed based on the image formation preparatory instruction may be different from each other. In such cases, it is required to switch the image forming speed and then perform the image formation, and hence there is a fear in that the FPOT is rather increased. Further, a photosensitive drum or the like is consumed even while a switching operation of the image forming speed is performed, and hence there is also a fear in that consumption of a life of a consumable item is increased.

SUMMARY

The present disclosure has been made in view of such circumstances, and has an object to suppress, for example, in an image forming apparatus having a plurality of image forming speeds, occurrence of a switching operation of the image forming speed while reducing a first print out time, to thereby suppress an increase of the first print out time and progress of a life of a consumable item.

In order to achieve the above-mentioned object, according to the present disclosure, there is provided an image forming apparatus comprising: a container unit configured to contain a recording material; an image forming unit configured to perform image formation onto the recording material conveyed from the container unit; a control unit configured to perform a preparatory operation for the image formation at an image forming speed before the image forming unit performs the image formation onto the recording material; and a first detection unit configured to detect a size of the recording material contained in the container unit, wherein the control unit is configured to judge whether to execute the preparatory operation based on the size of the recording material detected by the first detection unit.

Further features of the present disclosure will become apparent from the following description of exemplary embodiments with reference to the attached drawings.

DESCRIPTION OF THE EMBODIMENTS

Embodiments of the present disclosure are now described in detail with reference to the accompanying drawings.

First Embodiment

An image forming apparatus of a first embodiment can perform a preparatory operation for image formation (hereinafter referred to as "pre-start operation") at a predetermined image forming speed before the image formation is performed onto a recording material. When an instruction of the pre-start operation (preparatory operation) is given from an image controller portion prior to the timing at which a print instruction is received, the following control is performed. That is, it is judged, based on a detection result of a first detection unit configured to detect a size of a recording material P, whether or not the image forming speed at the time of an image forming operation is the same as the image forming speed at the time of the pre-start operation. When the image forming speeds are different from each other, it is judged not to perform the pre-start operation. Details thereof are described below.

[Overall Configuration of Image Forming Apparatus]

Figure 1:
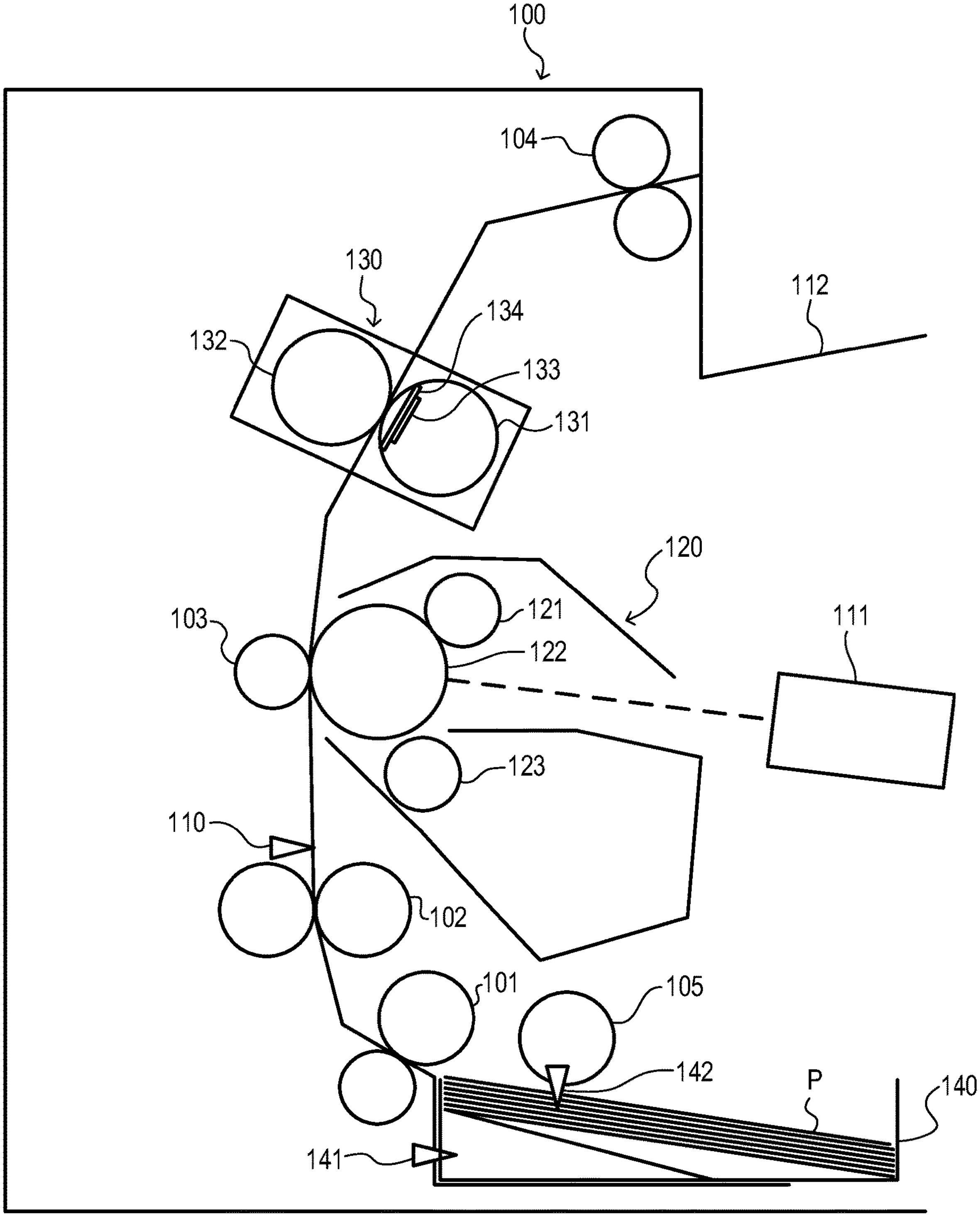
FIG. 1 is a sectional view of an image forming apparatus according to one or more aspect of the present disclosure.

FIG. 1 is a sectional view of an image forming apparatus 100 of the first embodiment. The image forming apparatus 100 includes a feed cassette 140. The feed cassette 140 is mountable and removable, and serves as a container unit configured to contain the recording materials P. Whether the feed cassette 140 is mounted or removed can be detected by a cassette presence/absence sensor 141. The presence or absence of the recording material P of the feed cassette 140 can be detected by a recording material presence/absence sensor 142. Further, the image forming apparatus 100 includes a cartridge 120. The cartridge 120 includes a charge roller 121, a photosensitive drum 122, and a developing sleeve 123, and is mountable to and removable from the image forming apparatus 100.

When the feed cassette 140 has the recording materials P stacked thereon, in a case in which the image forming apparatus 100 receives an image formation preparatory operation instruction (hereinafter referred to as "pre-start instruction") from an external apparatus, for example, a personal computer via an image controller, the image forming apparatus 100 drives a motor (not shown). Separation rollers 101, registration rollers 102, a transfer roller 103, the charge roller 121, the photosensitive drum 122, the developing sleeve 123, a heating film 131, a pressure roller 132, and delivery rollers 104 are driven by the motor. A surface of the photosensitive drum 122 is uniformly charged by the charge roller 121 to have a predetermined potential at, for example, a negative polarity.

When a print instruction is received thereafter, the image forming apparatus 100 drives a feed solenoid (not shown) in addition to the drive of the motor. When the feed solenoid is driven, a pickup roller 105 is driven for a predetermined time period and is also lowered onto an upper surface of the recording material P so that the recording materials P are fed one by one to a conveyance path. When the recording material P passes through the separation rollers 101 and the registration rollers 102 to reach a registration sensor 110, an electrostatic latent image is formed on the surface of the photosensitive drum 122 by laser light emitted from an exposure device 111. The electrostatic latent image formed on the photosensitive drum 122 is visualized as a toner image when toner is caused to adhere onto the electrostatic latent image by the developing sleeve 123.

The toner image is transferred onto the recording material P when the toner image passes over the transfer roller 103 in synchronization with the rotation of the photosensitive drum 122. The recording material P bearing the unfixed toner image is introduced into a fixing device 130, and is applied with pressure at a nip portion formed by the heating film 131 and the pressure roller 132. The unfixed toner image is fixed by being heated by a heater 134 controlled so that a temperature detected by a thermistor 133 becomes a suitable fixing temperature. The recording material P having an image fixed thereto is delivered onto a delivery tray 112 by the delivery rollers 104. The above-mentioned members contributing when the image formation is performed onto the recording material P function as an image forming portion serving as an image forming unit. The image forming apparatus 100 is capable of carrying out duplex printing in which the image formation is performed on both of a front side and a back side of one recording material P, and further includes a duplex printing conveyance path (not shown). Further, an image forming apparatus to which the present disclosure is applicable is not limited to the image forming apparatus 100 described with reference to FIG. 1. The same holds true also for other embodiments.

[Recording Material Width Detection Mechanism]

Figure 2:
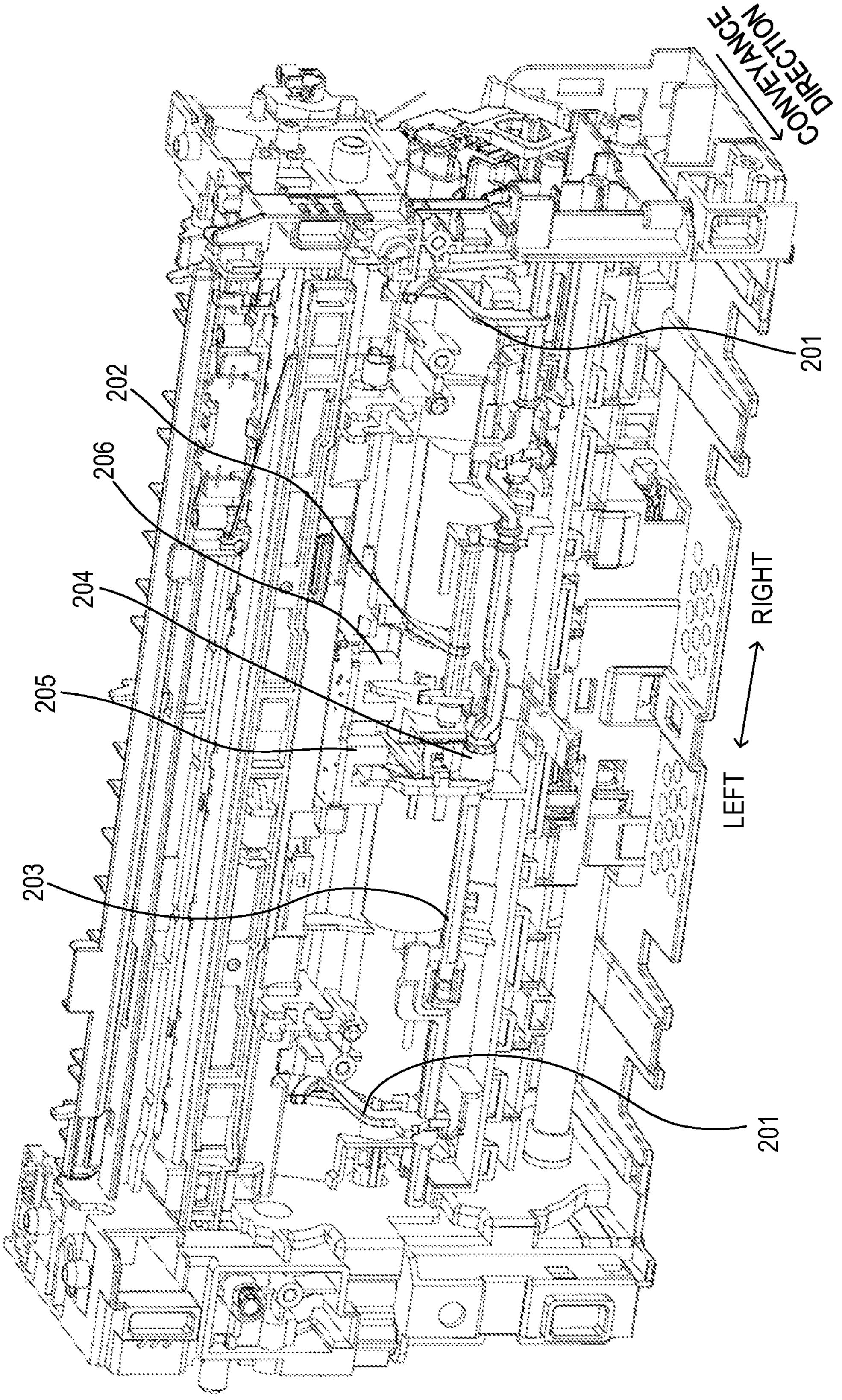
FIG. 2 is a perspective view for illustrating a main part of a recording material width detection mechanism according to one or more aspect of the present disclosure.

Next, a recording material width detection mechanism in the first embodiment is described in detail. A recording material width herein refers to a length (width) of the recording material P in a direction orthogonal to the conveyance direction. FIG. 2 is a mechanical configuration view of the recording material width detection mechanism, and also shows the conveyance direction and right and left directions. When the recording material P passes through the recording material width detection mechanism, flags 201 arranged on right and left sides, and a flag 202 rotate to a front side. The flags 201 are flags for use to detect the recording material width, and the flag 202 is a flag included in the registration sensor 110. Further, the conveyance direction of the recording material P is a direction directed from a depth side to the front side of FIG. 2. Further, the right and left sides are defined in the direction orthogonal to the conveyance direction of the recording material P as viewed from the front side of FIG. 2.

When the flags 201 arranged on the right and left sides rotate, parts serving as retainers for a link 203 also rotate. Then, the link 203 rotates due to an action of a spring 204 so that a photo interrupter 205 is brought into a state in which light is transmitted (hereinafter simply referred to as "transmission state") from a state in which light is blocked (hereinafter simply referred to as "light blocking state"). That is, this detection mechanism has a configuration in which the recording material P can be detected only when both of the flags 201 arranged on the right and left sides of the conveyance path detect the passing of the recording material P. The entire mechanism including the flags 201, the link 203, the spring 204, and the photo interrupter 205 is referred to as a "recording material width sensor" in the first embodiment. In the first embodiment, the flags 201 are arranged at positions at which a recording material P having a size smaller than an A4 size having a first width cannot be detected, but a recording material P having the A4 size or larger can be reliably detected. Further, the recording material P having the A4 size or larger (having the first width or larger), which can be detected by the flags 201, is referred to as having a "wide width," and the recording material P having a size smaller than the A4 size (having a width smaller than the first width), which cannot be detected by the flags 201, is referred to as having a "narrow width." However, the arrangement of the flags 201 is not limited thereto, and the arrangement may be determined as appropriate depending on the characteristic of the apparatus. That is, the recording material P having the first width may be changed to a recording material P having another size.

Meanwhile, when the flag 202 rotates, a part of the flag blocking light of a photo interrupter 206 also rotates. The flag 202 and the photo interrupter 206 are illustrated as a single sensor unit corresponding to the registration sensor 110 of FIG. 1. The photo interrupter 205 and the photo interrupter 206 are brought into the transmission state from the light blocking state at substantially the same timing. Accordingly, whether the photo interrupter 205 is in the transmission state or the light blocking state is checked while the registration sensor 110 in the vicinity of the center of the recording material P detects the recording material P, so that the recording material width of the recording material P can be correctly detected. That is, the recording material width of the recording material P is detected by the recording material width sensor and the registration sensor 110.

[Configuration of Speed Control System of Image Forming Apparatus]

Figure 3:
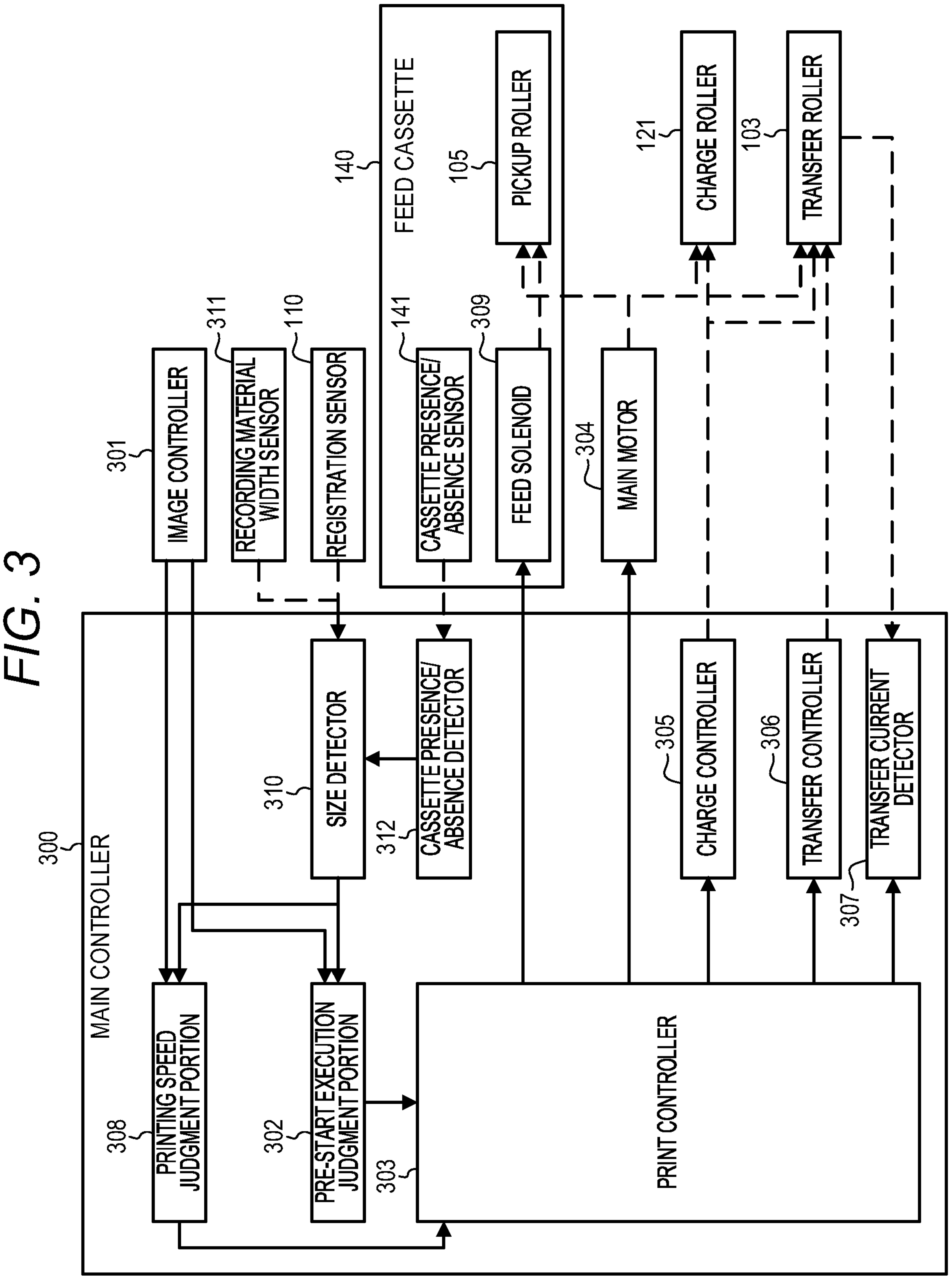
FIG. 3 is a control block diagram of the image forming apparatus according to one or more aspect of the present disclosure.

Next, a speed control system of the image forming apparatus 100 is described. FIG. 3 is a block diagram for illustrating a configuration of the speed control system of the image forming apparatus 100. A main controller 300 serving as a control unit at least includes a printing speed judgment portion 308, a pre-start execution judgment portion 302, and a print controller 303. The main controller 300 includes a CPU serving as an arithmetic device, a ROM, and a RAM. The CPU reads various programs stored in the ROM to execute processing. The RAM is used as a work area of the CPU. The main controller 300 is a control unit capable of performing the preparatory operation for image formation at the predetermined image forming speed before the image forming unit performs the image formation onto the recording material P.

When the main controller 300 receives the pre-start instruction from an image controller 301, the main controller 300 causes the pre-start execution judgment portion 302 to judge the speed, and causes the print controller 303 to operate at a predetermined setting. The print controller 303 drives a main motor 304, and also causes a charge controller 305 to apply a charging voltage having, for example, a negative polarity to the charge roller 121 so that the photosensitive drum 122 is uniformly charged. Further, the charging voltage having the negative polarity generated by the charge controller 305 is also applied to the transfer roller 103. After that, when a transfer controller 306 outputs a predetermined transfer voltage having a positive polarity, the transfer roller 103 is applied with a voltage obtained by superimposing the charging voltage having the negative polarity and the transfer voltage having the positive polarity. A transfer current detector 307 detects a value of a current flowing through the transfer roller 103. The transfer controller 306 is adjusted so that the value of the current flowing through the transfer roller 103 becomes constant. In this manner, a potential setting suitable for the image formation is performed. This control is referred to as an "active transfer voltage control" (hereinafter abbreviated as "ATVC").

In general, a suitable charging voltage and a suitable speed of image formation (hereinafter referred to as "image forming speed") vary depending on the type and the size of the recording material P on which an image is to be formed. Thus, the image controller 301 outputs the print instruction to settle the type of the recording material P (hereinafter also referred to as "type designation") and size information. The type of the recording material P includes, for example, information such as plain paper, thin paper, thick paper, glossy paper, and a basis weight of the recording material P. The size information includes, for example, information on standard sheet sizes, for example, A4 and B4, and non-standard sheet sizes.

When receiving the print instruction, the main controller 300 causes the printing speed judgment portion 308 to settle the settings of the conveyance speed and the charging voltage and notify the print controller 303 of the settings. The print controller 303 compares whether the settings of the conveyance speed and the charging voltage at which the operation has been performed based on the pre-start instruction match the notification received from the printing speed judgment portion 308. In a case in which the settings differ from the notification, the print controller 303 gives an instruction of switching control. The switching control is described later. In a case in which the switching control is not required, or in a case in which a switching operation is completed, the print controller 303 drives a feed solenoid 309 so that the recording material P is fed and the image formation is started.

A size detector 310 serving as the first detection unit checks the logic of a recording material width sensor 311 after a predetermined time period has elapsed from when the registration sensor 110 detects a leading edge of the recording material P so as to detect width information on the recording material P, and stores a detection result into a storage (not shown). The size detector 310 detects, for example, a width of a recording material P conveyed first after the recording material P of the feed cassette 140 is replaced, and stores the result into the storage. A cassette presence/absence detector 312 serving as a second detection unit always monitors the logic of the cassette presence/absence sensor 141. The cassette presence/absence detector 312 notifies, in a case in which the logic changes from cassette presence to cassette absence, the size detector 310 of the cassette absence, and the size detector 310 clears the width information on the recording material P associated with the feed cassette 140. The print controller 303 controls the feed solenoid 309 to operate the pickup roller 105.

[Speed Judgment Flow Chart]

(Pre-Start Execution Judgment Processing)

Figure 4A:
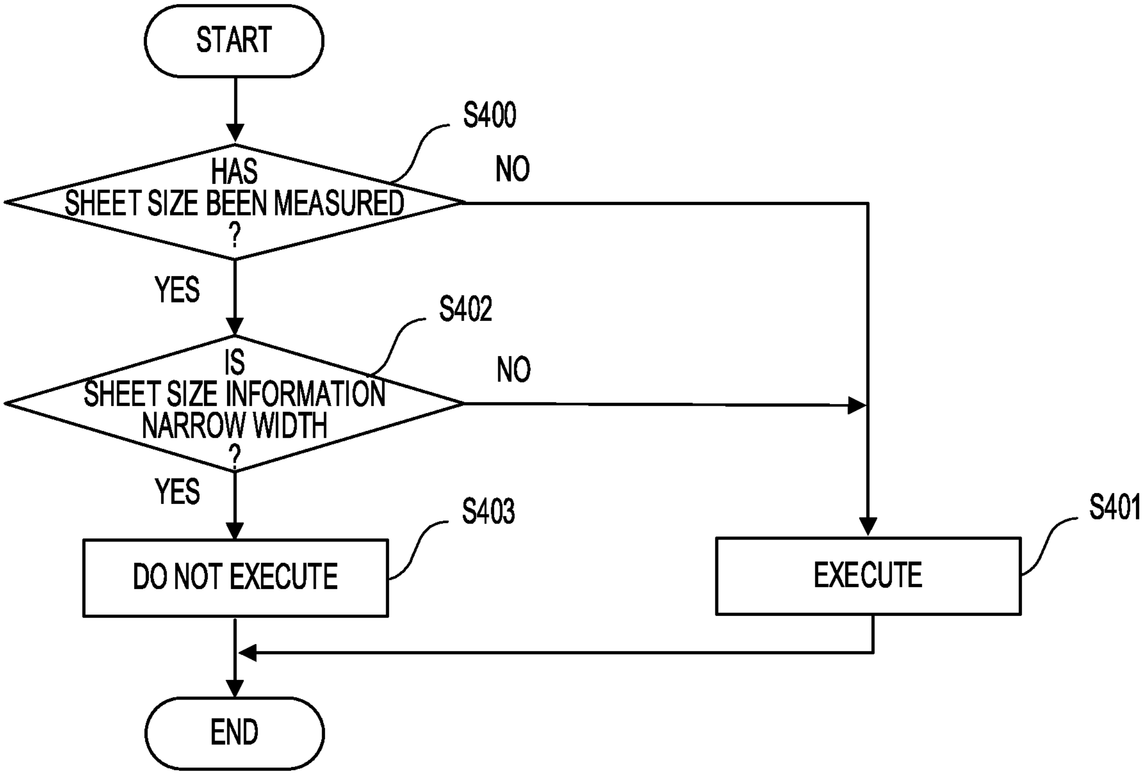
FIG. 4A is a flow chart of processing to be performed by a pre-start execution judgment portion according to one or more aspect of the present disclosure.

FIG. 4A is a flow chart for illustrating processing to be performed by the pre-start execution judgment portion 302 serving as a judgment unit. When the main controller 300 receives the pre-start instruction from the image controller 301, the pre-start execution judgment portion 302 executes processes of Step (hereinafter abbreviated as "S") 400 and thereafter. In S400, the pre-start execution judgment portion 302 judges whether or not the size of the recording material P (hereinafter referred to as "sheet size") is measured (has been measured) by the size detector 310. In a case in which the pre-start execution judgment portion 302 judges that the sheet size has not been measured in S400, the pre-start execution judgment portion 302 advances the process to S401. In a case in which the pre-start execution judgment portion 302 judges that the sheet size has been measured in S400, the pre-start execution judgment portion 302 advances the process to S402. In S401, the pre-start execution judgment portion 302 judges to execute the pre-start assuming that a recording material having a wide width is set in the feed cassette 140, and ends the processing. In S402, the pre-start execution judgment portion 302 refers to the sheet size information stored in the storage in association with the feed cassette 140, and judges whether or not the sheet size information is the narrow width. In a case in which the pre-start execution judgment portion 302 judges that the sheet size information is the narrow width in S402, the pre-start execution judgment portion 302 advances the process to S403. In a case in which the pre-start execution judgment portion 302 judges that the sheet size information is not the narrow width but the wide width in S402, the pre-start execution judgment portion 302 advances the process to S401. In a case in which the sheet size is the narrow width, it is required to perform printing at a low speed, that is, perform image formation at a low image forming speed. Thus, in S403, the pre-start execution judgment portion 302 judges not to execute the pre-start, and ends the processing.

(Printing Speed Judgment Processing)

Figure 4B:
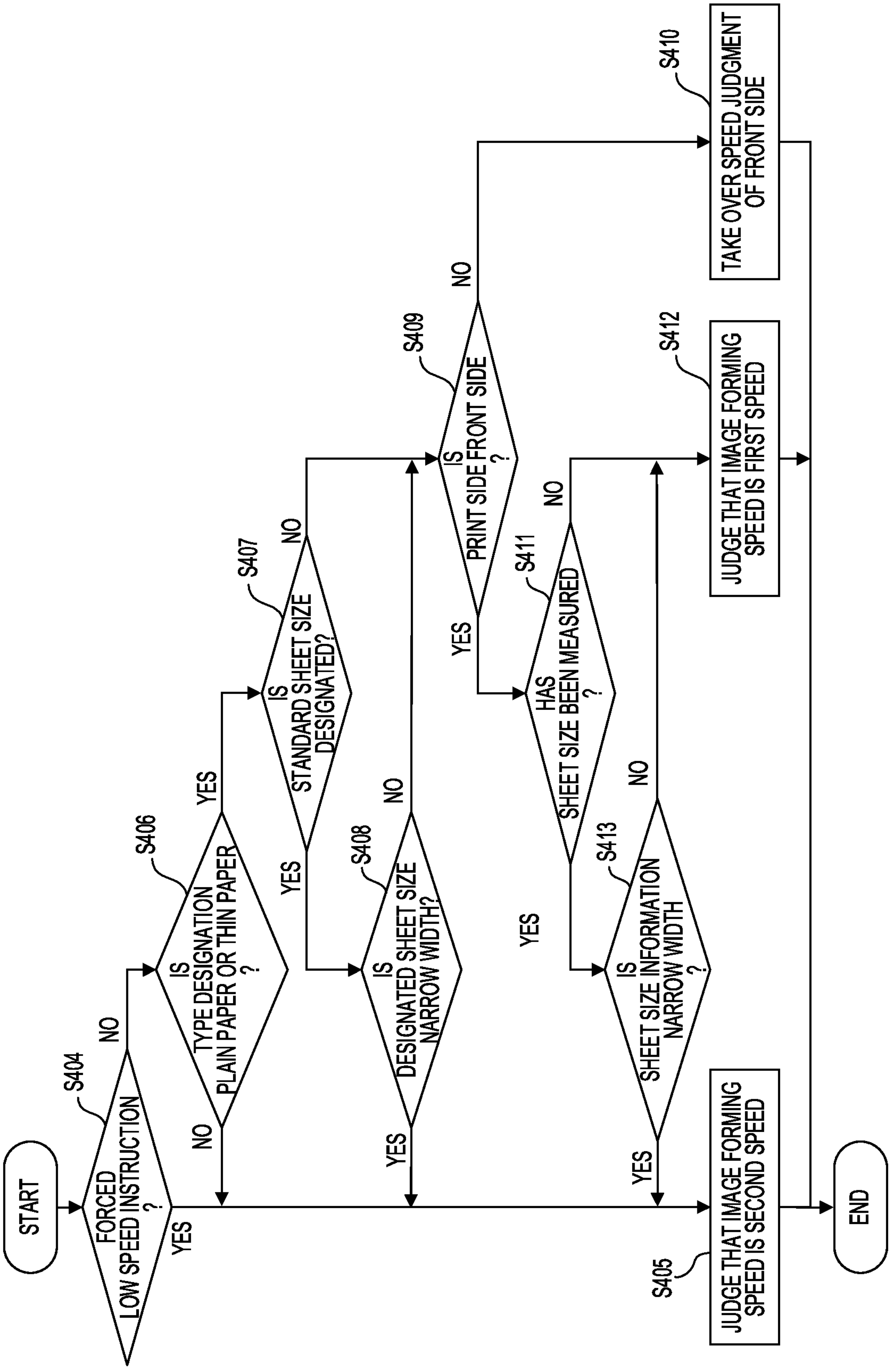
FIG. 4B is a flow chart of processing to be performed by a printing speed judgment portion according to one or more aspect of the present disclosure.

FIG. 4B is a flow chart for illustrating processing to be performed by the printing speed judgment portion 308 serving as a determination unit. When the main controller 300 receives the print instruction, the printing speed judgment portion 308 executes processes of S404 and thereafter. In S404, the printing speed judgment portion 308 judges whether or not a forced low speed instruction has been received from the image controller 301. In a case in which the printing speed judgment portion 308 judges that the forced low speed instruction has been received in S404, the printing speed judgment portion 308 advances the process to S405. In a case in which the printing speed judgment portion 308 judges that the forced low speed instruction has not been received in S404, the printing speed judgment portion 308 advances the process to S406. In S405, the printing speed judgment portion 308 judges that the image forming speed (hereinafter also simply referred to as "speed") is a second speed different from the first speed, and ends the processing. In S406, the printing speed judgment portion 308 refers to the type designation of the recording material P, and judges whether or not plain paper or thin paper is designated. In a case in which the printing speed judgment portion 308 judges that plain paper or thin paper is designated in S406, the printing speed judgment portion 308 advances the process to S407. In a case in which the printing speed judgment portion 308 judges that plain paper or thin paper is not designated in S406, the printing speed judgment portion 308 advances the process to S405.

In S407, the printing speed judgment portion 308 judges whether or not a standard sheet size is designated. In a case in which the printing speed judgment portion 308 judges that a standard sheet size is designated in S407, the printing speed judgment portion 308 advances the process to S408. Ina case in which the printing speed judgment portion 308 judges that a standard sheet size is not designated in S407, the printing speed judgment portion 308 advances the process to S409. In S408, the printing speed judgment portion 308 refers to the designated sheet size, and judges whether or not the sheet size is the narrow width. In a case in which the printing speed judgment portion 308 judges that the sheet size is the narrow width in S408, the printing speed judgment portion 308 advances the process to S405. In a case in which the printing speed judgment portion 308 judges that the sheet size is the wide width in S408, the printing speed judgment portion 308 advances the process to S409.

In S409, the printing speed judgment portion 308 refers to the print side, and judges whether or not the print side is the front side. In a case in which the printing speed judgment portion 308 judges that the print side is the front side in S409, the printing speed judgment portion 308 advances the process to S411. In a case in which the printing speed judgment portion 308 judges that the print side is the back side in S409, the printing speed judgment portion 308 advances the process to S410. In S410, the printing speed judgment portion 308 takes over the speed judgment of the front side so that the speed matches the speed of the front side, and ends the processing. In S411, the printing speed judgment portion 308 judges whether or not the sheet size has been measured by the size detector 310. In a case in which the printing speed judgment portion 308 judges that the sheet size has been measured in S411, the printing speed judgment portion 308 advances the process to S413. In a case in which the printing speed judgment portion 308 judges that the sheet size has not been measured in S411, the printing speed judgment portion 308 advances the process to S412. In S412, the printing speed judgment portion 308 judges that the image forming speed is the first speed assuming that the recording material having the wide width is set in the feed cassette 140, and ends the processing. In S413, the printing speed judgment portion 308 judges whether or not the sheet size information stored in the storage is the narrow width. In a case in which the printing speed judgment portion 308 judges that the sheet size information is the narrow width in S413, the printing speed judgment portion 308 advances the process to S405. In a case in which the printing speed judgment portion 308 judges that the sheet size information is the wide width in S413, the printing speed judgment portion 308 advances the process to S412. In the first embodiment, the second speed is, for example, a speed lower than the first speed. Further, the predetermined image forming speed at the time of the preparatory operation is the first speed.

As described above, in the first embodiment, the judgment of FIG. 4A and the judgment of FIG. 4B are combined so that the following control is performed. In the first embodiment, regardless of the information settled at the timing at which the print instruction is received, in a case in which the occurrence of the speed switching can be judged at the stage of the pre-start instruction based on the recording material width information stored by the size detector 310, the pre-start is not executed. Now, a change in control and an effect obtained when the pre-start is not executed are specifically described.

[Timing Chart from Print Start to Feed Control Start]

Figure 5A:
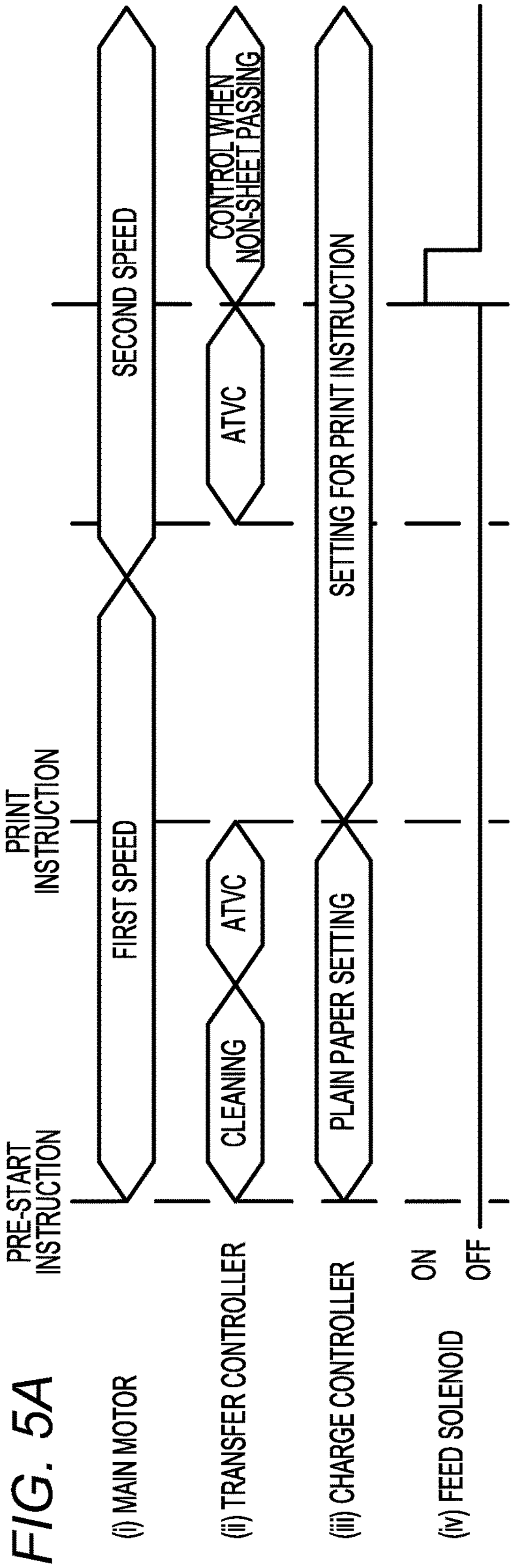
FIG. 5A and FIG. 5B are control timing charts according to one or more aspect of the present disclosure.
Figure 5B:
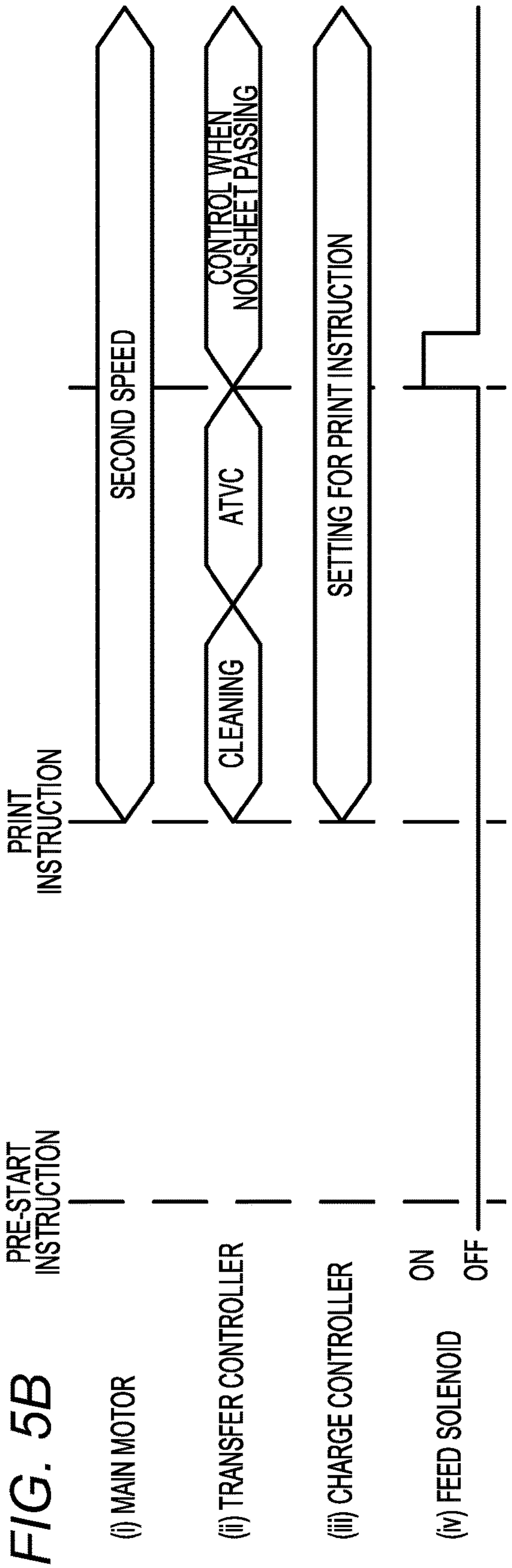

FIG. 5A and FIG. 5B are timing charts from the pre-start instruction to the feeding of the recording material P in the first embodiment. FIG. 5A is a timing chart in a case in which the pre-start is executed and the speed switching is executed in response to the print instruction. FIG. 5B is a timing chart from when, without executing the pre-start, the print operation is started at a low speed after the print instruction is received to when the recording material P is fed. Further, in FIG. 5A and FIG. 5B, part (i) indicates the speed (first speed, second speed, or the like) of the main motor 304, and part (ii) indicates the control (cleaning, ATVC, control when non-sheet passing, or the like) performed by the transfer controller 306. Part (iii) indicates the control (plain paper setting, setting for print instruction, or the like) performed by the charge controller 305, and part (iv) indicates whether the feed solenoid 309 is turned on (ON, indicated by high level) or off (OFF, indicated by low level). The horizontal axis in each chart represents time. In the following, FIG. 5A and FIG. 5B are described and compared with each other.

In the case of FIG. 5A, when the pre-start instruction is received from the image controller 301, the drive of the main motor 304 is started at the first speed. The charge controller 305 applies the charging voltage at the plain paper setting so that the photosensitive drum 122 is uniformly charged. In a section until the photosensitive drum 122 is uniformly charged, the transfer controller 306 does not execute the transfer control. Accordingly, the transfer roller 103 is applied with a voltage having a negative polarity due to the charging voltage so that cleaning control of ejecting toner having a negative polarity onto the photosensitive drum 122 is performed. After the photosensitive drum 122 is uniformly charged, the transfer controller 306 applies a positive voltage to start the ATVC. When the printing speed judgment portion 308 receives the print instruction from the image controller 301 and judges the speed as the second speed, the charge controller 305 switches the control to a charging voltage setting (setting for print instruction) corresponding to the print instruction. After waiting until the photosensitive drum 122 is uniformly charged at the switched charging voltage setting, the print controller 303 switches the speed of the main motor 304 to the second speed. The transfer controller 306 executes the ATVC until the feeding of the recording material P is started, and executes the control when non-sheet passing after the feeding of the recording material P is started. When non-sheet passing refers to the time in which no recording material P passes over the transfer roller 103. Control when non-sheet passing is publicly-known control, and hence description thereof is omitted. Through such control, the timing at which the photosensitive drum 122 is uniformly charged is accurately judged. The charging voltage setting is changed, and hence the relationship of the current flowing through the transfer roller 103 is changed. In order to form an image at a suitable setting, the transfer controller 306 re-executes the ATVC. After the ATVC is completed, the print controller 303 can output a feed instruction to the feed solenoid 309.

Meanwhile, in the case of FIG. 5B, even when the pre-start instruction is received from the image controller 301, the print controller 303 does not execute the pre-start based on the judgment of the pre-start execution judgment portion 302. When the print controller 303 receives the print instruction from the image controller 301 and the printing speed judgment portion 308 judges the speed as the second speed, the drive of the main motor 304 is started at the second speed from the beginning, and also the charge controller 305 applies the charging voltage at the charging voltage setting corresponding to the print instruction. After waiting until the photosensitive drum 122 is uniformly charged, the transfer controller 306 starts the ATVC. After the ATVC is completed, the print controller 303 can output the feed instruction to the feed solenoid 309.

When FIG. 5A and FIG. 5B are compared with each other, in a section from the pre-start instruction to the print instruction in which the main motor 304 is driven at the first speed, and a section in which there is a speed difference until the speed of the main motor 304 is switched, the life of the photosensitive drum 122 progresses more in FIG. 5A. Further, when the drive of the feed solenoid 309 from the pre-start instruction is compared, the feeding can be started earlier when the pre-start is not executed as in FIG. 5B.

As described above, at a stage at which the pre-start instruction is received, it is judged whether or not to execute the pre-start, and the pre-start is not executed in some cases. In this manner, the life of the consumable item is not needlessly reduced, and a time period from the pre-start instruction to the feeding can be optimized depending on the situation.

As described above, according to the first embodiment, in the image forming apparatus having the plurality of image forming speeds, the occurrence of the switching operation of the image forming speed is suppressed while the first print out time is reduced, thereby being capable of suppressing the increase of the first print out time and the progress of the life of the consumable item.

Second Embodiment

A sectional view of the image forming apparatus 100 is equivalent to that of the first embodiment, and hence illustration thereof is omitted. In a second embodiment, a judgment method of the pre-start execution judgment portion 302 in a case in which a size detection mechanism of a recording material width regulation plate on the feed cassette 140 is used instead of the recording material width sensor on the conveyance path is described.

[Recording Material Width Detection Mechanism]

Figure 6:
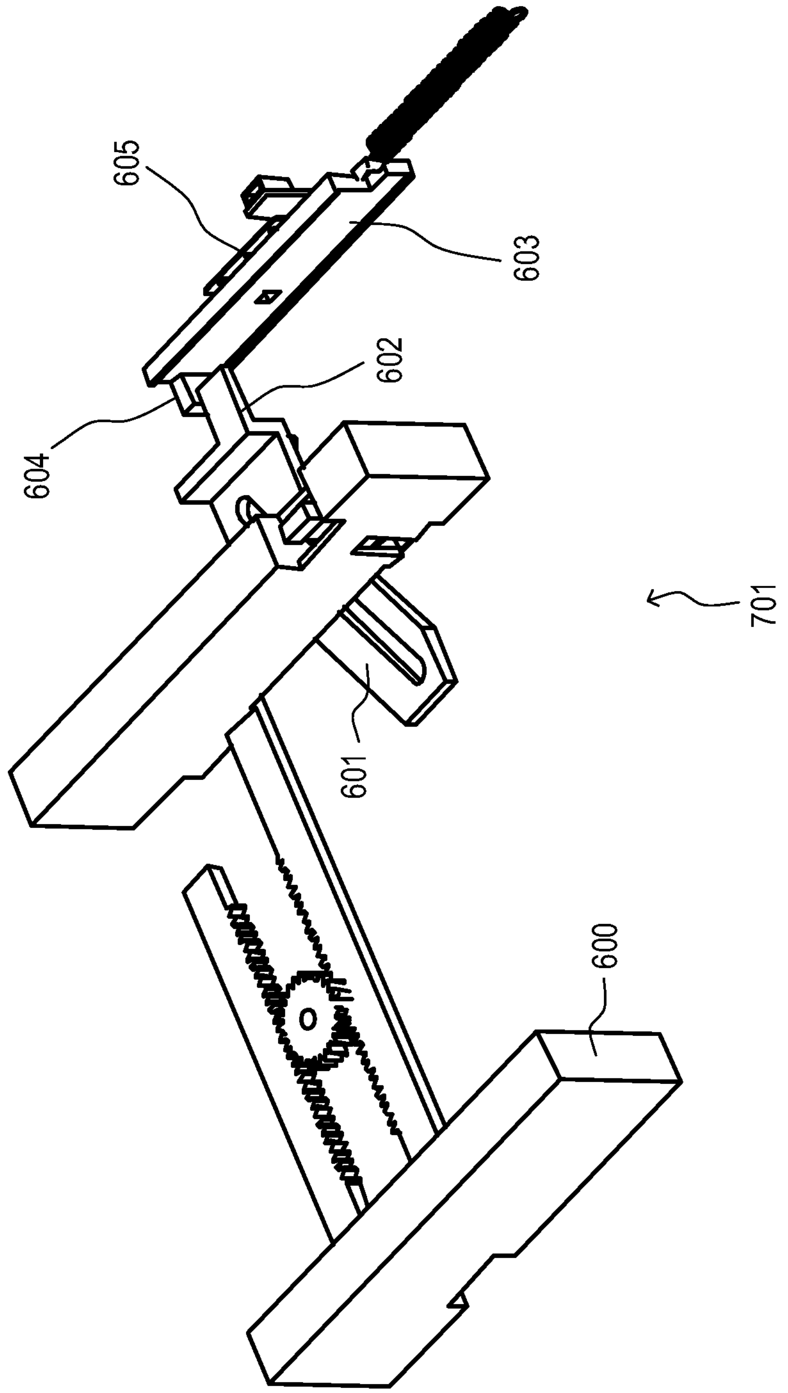
FIG. 6 is a perspective view for illustrating a main part of a size detection mechanism according to one or more aspect of the present disclosure.

FIG. 6 is a view for illustrating configurations of the recording material width regulation plate arranged on the feed cassette 140, and the size detection mechanism using the recording material width regulation plate. When a recording material width regulation member 600 is slid in accordance with the recording material, a cassette cam 601 moves in association therewith. After that, when the feed cassette 140 is set to the image forming apparatus 100, a right end rib 602 of the cassette cam 601 pushes a rib portion 604 of a main body cam 603 so that a protruding portion of a slide variable resistor 605 moves. When a resistance value of the slide variable resistor 605 is detected, the sheet size width can be detected. A mechanism for detecting the recording material width through use of the recording material width regulation member 600 is hereinafter referred to as "position sensor 701."

[Configuration of Speed Control System of Image Forming Apparatus]

Figure 7:
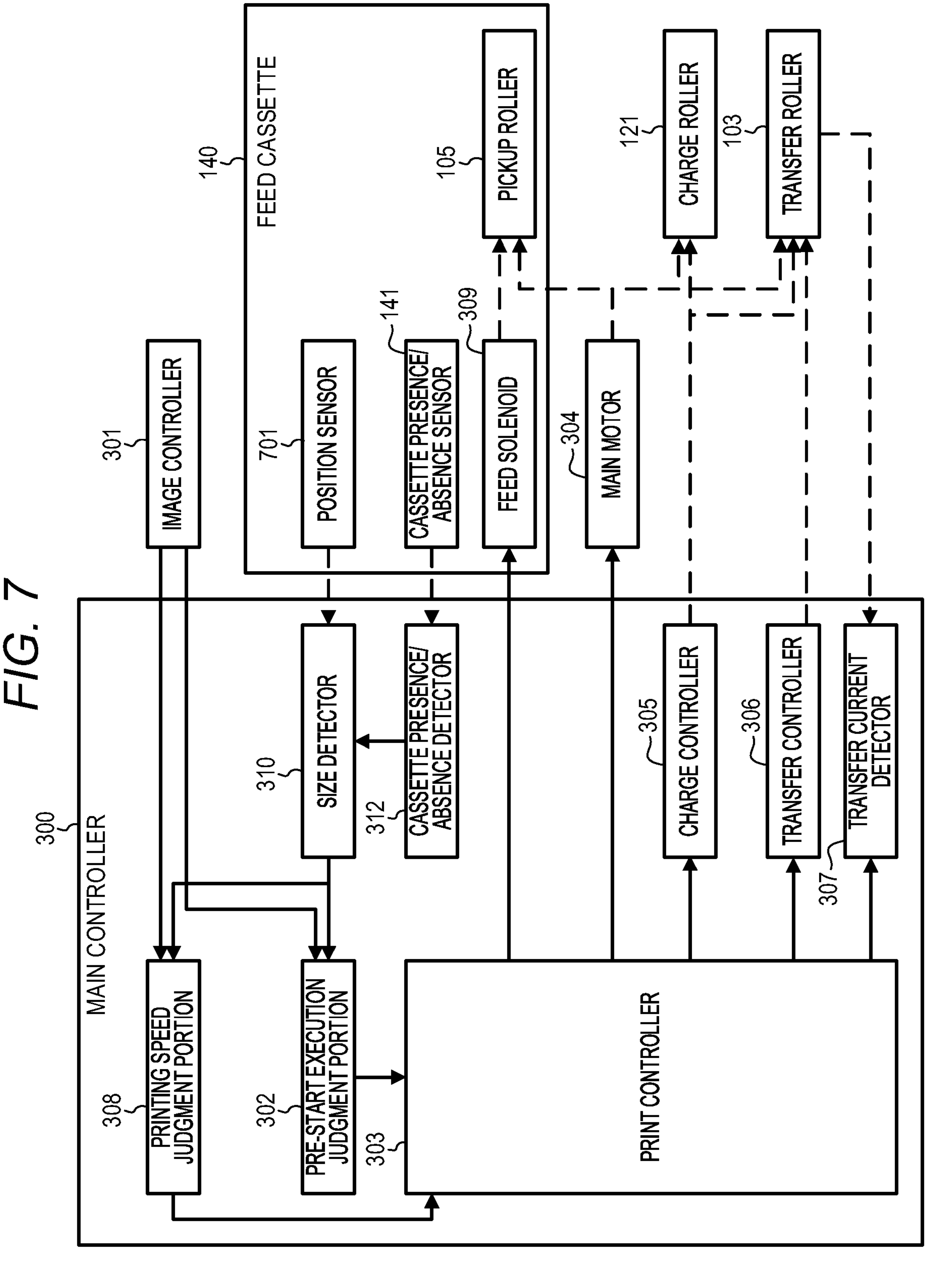
FIG. 7 is a control block diagram of the image forming apparatus according to one or more aspect of the present disclosure.

A speed control system in a case in which the recording material width regulation plate is used is described. FIG. 7 is a block diagram for illustrating a configuration of the speed control system. Description of parts having the same configurations as those of FIG. 3 is omitted. The size detector 310 acquires a detection result of the position sensor 701 obtained at or after the timing at which the feed cassette 140 is set with respect to the main controller 300, and stores the result into the storage (not shown).

[Speed Judgment Flow Chart]

(Pre-Start Execution Judgment Processing)

Figure 8A:
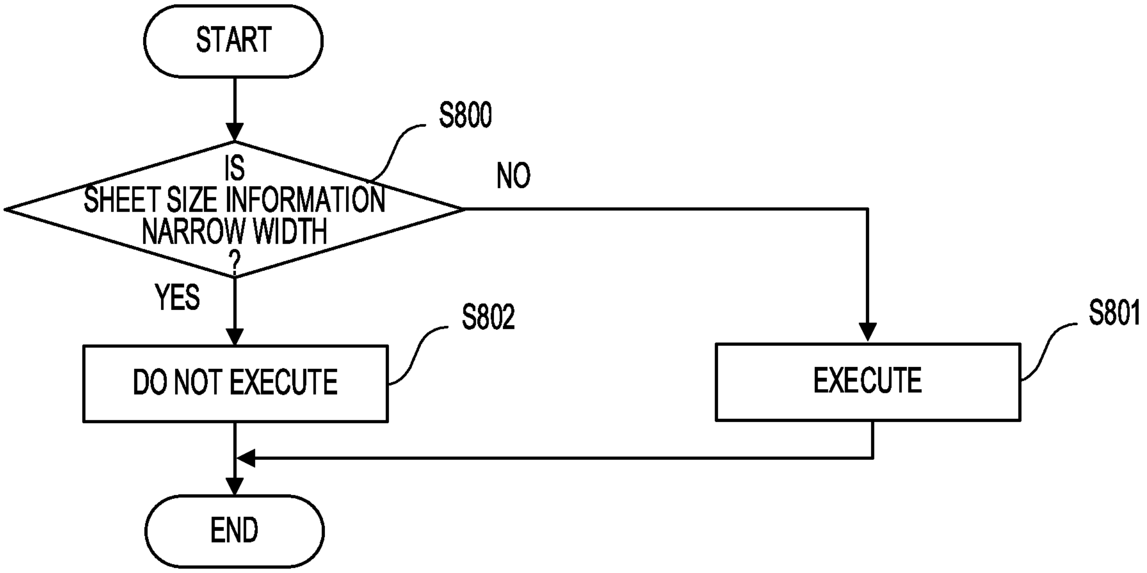
FIG. 8A is a flow chart of processing to be performed by a pre-start execution judgment portion according to one or more aspect of the present disclosure.

Judgment of the pre-start execution judgment portion 302 and judgment of the printing speed judgment portion 308 in the second embodiment are described with reference to FIG. 8A and FIG. 8B. FIG. 8A is a flow chart of the pre-start execution judgment portion 302. In S800, the pre-start execution judgment portion 302 refers to the sheet size information detected by the position sensor 701 and acquired by the size detector 310, and judges whether or not the sheet size information is the narrow width. In a case in which the pre-start execution judgment portion 302 judges that the sheet size information is the narrow width in S800, the pre-start execution judgment portion 302 advances the process to S802. In a case in which the pre-start execution judgment portion 302 judges that the sheet size information is the wide width in S800, the pre-start execution judgment portion 302 advances the process to S801. In S801, the pre-start execution judgment portion 302 judges to execute the pre-start, and ends the processing. In S802, the pre-start execution judgment portion 302 judges not to execute the pre-start because the printing is required to be performed at a low speed, and ends the processing.

(Printing Speed Judgment Processing)

Figure 8B:
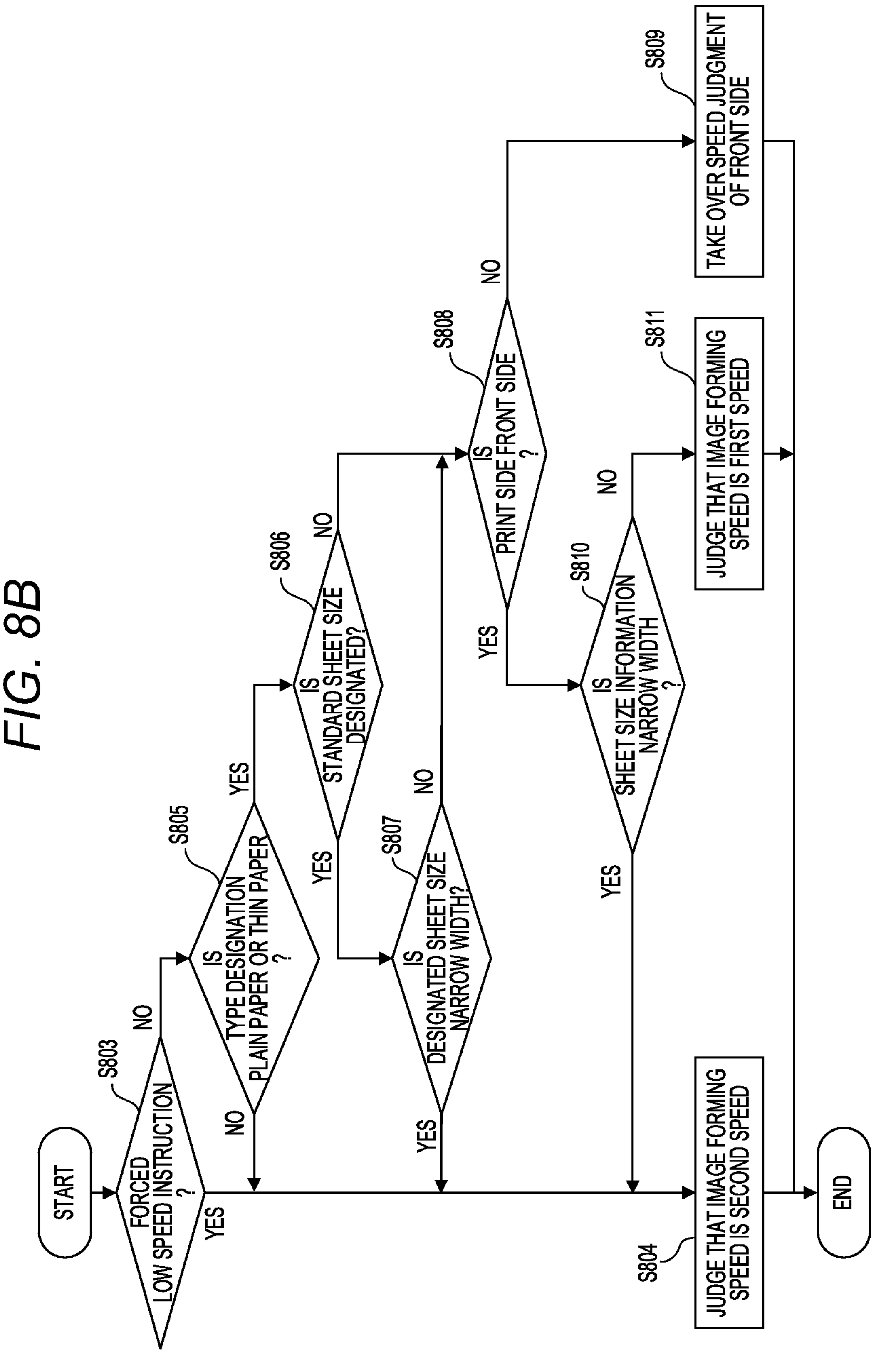
FIG. 8B is a flow chart of processing to be performed by a printing speed judgment portion according to one or more aspect of the present disclosure.

FIG. 8B is a flow chart of the printing speed judgment portion 308. Processes of S803 to S809 of FIG. 8B are the same as the processes of S404 to S410 in the flow chart of FIG. 4B, and hence description thereof is omitted. When the printing speed judgment portion 308 judges that the print side is the front side in S808, the printing speed judgment portion 308 advances the process to S810. This case corresponds to a case in which no forced low speed instruction is given from the image controller 301, plain paper or thin paper is designated as the type designation of the recording material P, a non-standard size is designated or the designated sheet size is a standard sheet size having a wide width, and the print side is the front side. In S810, the pre-start execution judgment portion 302 refers to the sheet size information stored in the storage, and judges whether or not the sheet size information is the narrow width. In a case in which the pre-start execution judgment portion 302 judges that the sheet size information is the wide width in S810, the pre-start execution judgment portion 302 advances the process to S811. In S811, the pre-start execution judgment portion 302 judges that the image forming speed is the first speed, and ends the processing. In a case in which the pre-start execution judgment portion 302 judges that the sheet size information is the narrow width in S810, the pre-start execution judgment portion 302 judges that the image forming speed is the second speed in S804, and ends the processing.

As described above, in a case of an image forming apparatus in which the feed cassette 140 includes the position sensor 701, the speed control is performed through use of the position sensor 701. In this case, even when a removing and inserting operation of the feed cassette 140 is performed, the judgment of the pre-start can be suitably performed immediately after the operation by the pre-start execution judgment portion 302 in accordance with the sheet size. Further, in the second embodiment, the configuration in which the width of the recording material is detected by the position sensor 701, which is arranged in the feed cassette 140, alone has been described. However, there is also conceivable a case in which the regulation plate is used without being appropriately placed by a user, and hence it is conceivable to use the regulation plate in combination with the recording material width sensor on the conveyance path as in the first embodiment. For example, even when the position sensor 701 is set at a position at which the recording material can be judged as having the wide width, in a case in which the size detector 310 judges that the sheet size information on the conveyed recording material is the narrow width, the processing may be performed as follows. That is, until the feed cassette 140 is replaced, the feed cassette 140 may be treated as having set therein the recording material having the narrow width.

As described above, according to the second embodiment, in the image forming apparatus having the plurality of image forming speeds, the occurrence of the switching operation of the image forming speed is suppressed while the first print out time is reduced, thereby being capable of suppressing the increase of the first print out time and the progress of the life of the consumable item.

Third Embodiment

In a third embodiment, a judgment method of the pre-start execution judgment portion 302 and the printing speed judgment portion 308 in a case in which the image forming apparatus 100 includes a plurality of feed cassettes is described.

[Overall Configuration of Image Forming Apparatus]

Figure 9:
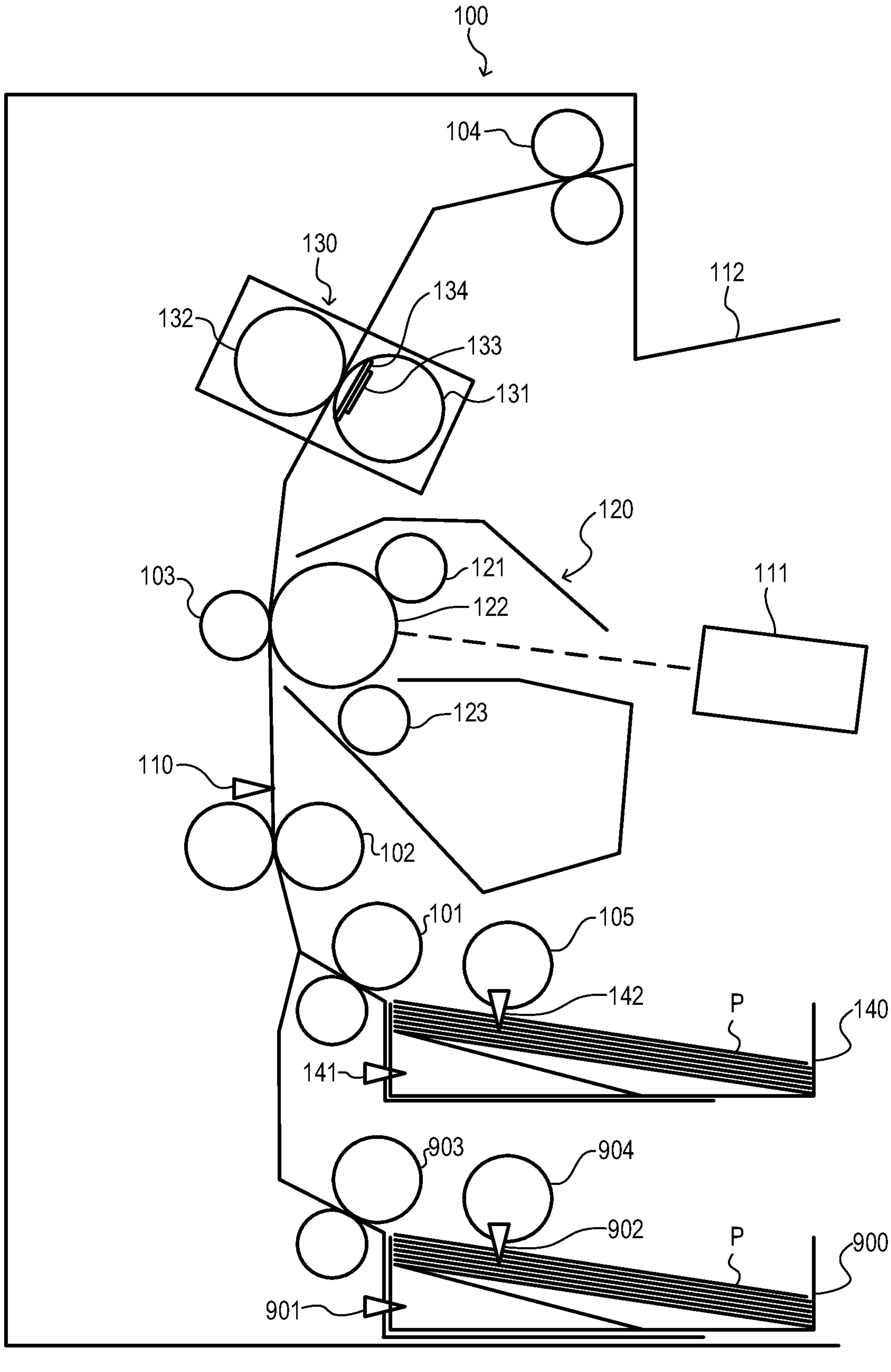
FIG. 9 is a sectional view of an image forming apparatus of a third embodiment.

FIG. 9 is a sectional view of the image forming apparatus 100 of the third embodiment. Description of parts having the same configurations as those of FIG. 1 is omitted. The image forming apparatus 100 includes a second feed cassette 900, and whether the feed cassette 900 is mounted or removed can be detected by a second cassette presence/absence sensor 901. The presence or absence of the recording material P of the feed cassette 900 can be detected by a second-cassette recording material presence/absence sensor 902. In the image forming apparatus 100, any one of the recording material P of the feed cassette 140 and the recording material P of the feed cassette 900 is designated at the stage of the print instruction from the image controller 301. When the printing is performed from the feed cassette 900, a feed solenoid (not shown) is driven in addition to the drive of the main motor 304. When the feed solenoid corresponding to the feed cassette 900 is driven, a pickup roller 904 is driven for a predetermined time period and is also lowered onto the upper surface of the recording material P so that one recording material P is fed by separation rollers 903 to the conveyance path. The feed cassette 900 includes the second cassette presence/absence sensor 901 and the second-cassette recording material presence/absence sensor 902. As a recording material width detection mechanism in the third embodiment, the same mechanism as that of the first embodiment is used, and hence description thereof is omitted.

[Configuration of Speed Control System of Image Forming Apparatus]

Figure 10:
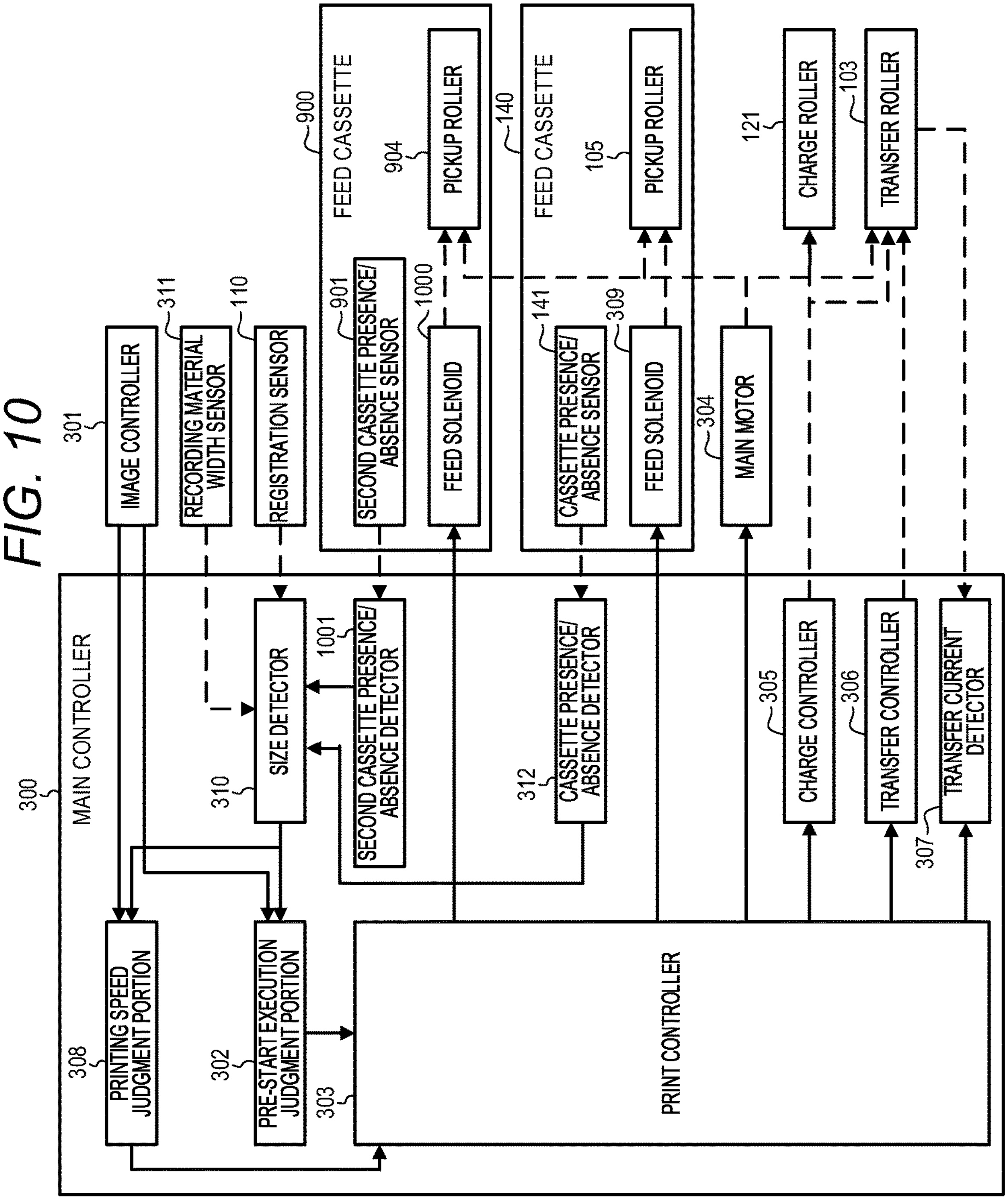
FIG. 10 is a control block diagram of the image forming apparatus according to one or more aspect of the present disclosure.

A speed control system of the image forming apparatus 100 of the third embodiment is described. FIG. 10 is a block diagram for illustrating a configuration of the speed control system. Description of parts having the same configurations as those of FIG. 3 is omitted. The image controller 301 outputs the print instruction to settle, in addition to the information of FIG. 3, feed cassette information on one of the plurality of feed cassettes to be used. The print controller 303 drives the feed solenoid 309 or a feed solenoid 1000 corresponding to the feed cassette information so that the recording material P is fed and an image is formed. The size detector 310 checks the logic of the recording material width sensor 311 after a predetermined time period has elapsed from when the registration sensor 110 detects the leading edge of the recording material P to detect the width information on the recording material P, and stores the detection result into the storage (not shown) in association with (in relation with) the feed cassette from which the recording material P is fed. Accordingly, when the cassette presence/absence detector 312 gives a notification indicating recording material absence of the feed cassette 140, the size detector 310 clears the width information on the recording material P associated with the feed cassette 140. Further, a second cassette presence/absence detector 1001 always monitors the logic of the second cassette presence/absence sensor 901, and, when the logic changes from feed cassette presence to feed cassette absence, the second cassette presence/absence detector 1001 notifies the size detector 310 of the recording material absence of the feed cassette 900. Then, the size detector 310 clears the width information on the recording material P associated with the feed cassette 900.

Through the control described above, even in an image forming apparatus including only a single recording material width detection mechanism with respect to a plurality of feeding ports (feed cassettes 140 and 900), the size information on the recording material P can be managed for each of the plurality of feeding ports. Next, a judgment method of the pre-start execution judgment portion 302 and the printing speed judgment portion 308 in the third embodiment is described.

[Speed Judgment Flow Chart]

(Pre-Start Execution Judgment Processing)

Figure 11A:
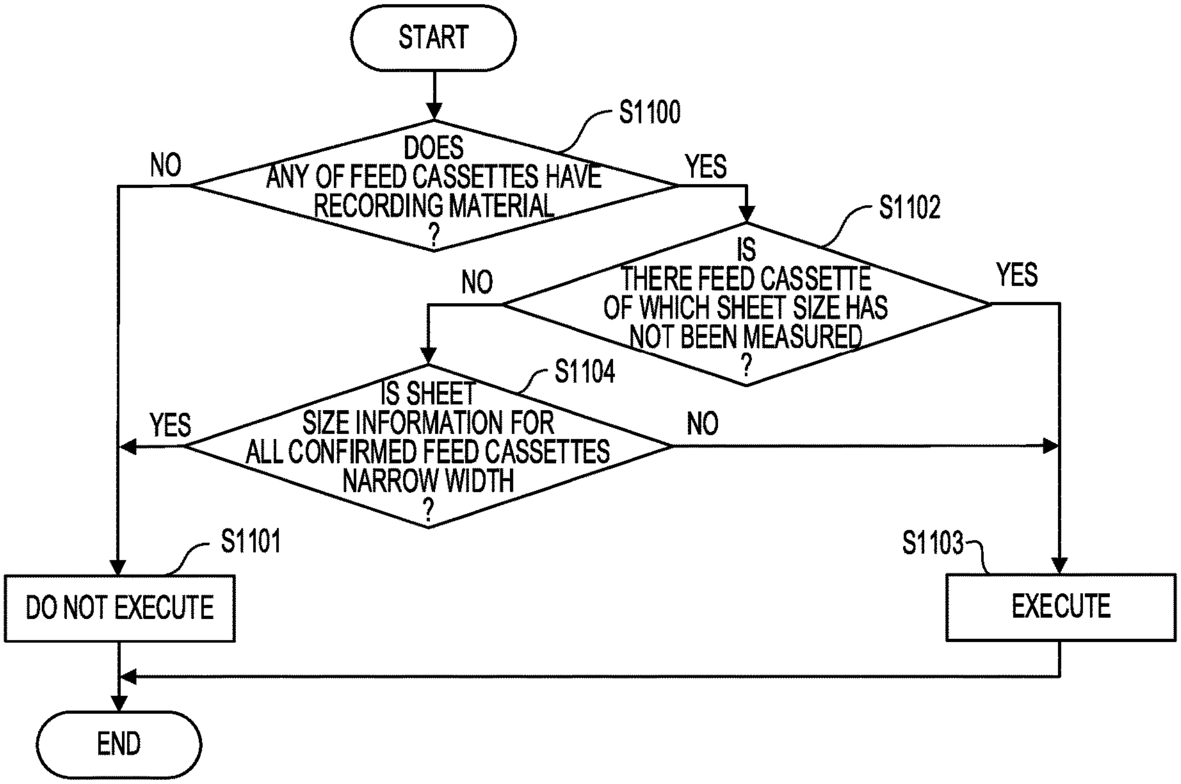
FIG. 11A is a flow chart of processing to be performed by a pre-start execution judgment portion according to one or more aspect of the present disclosure.
Figure 11B:
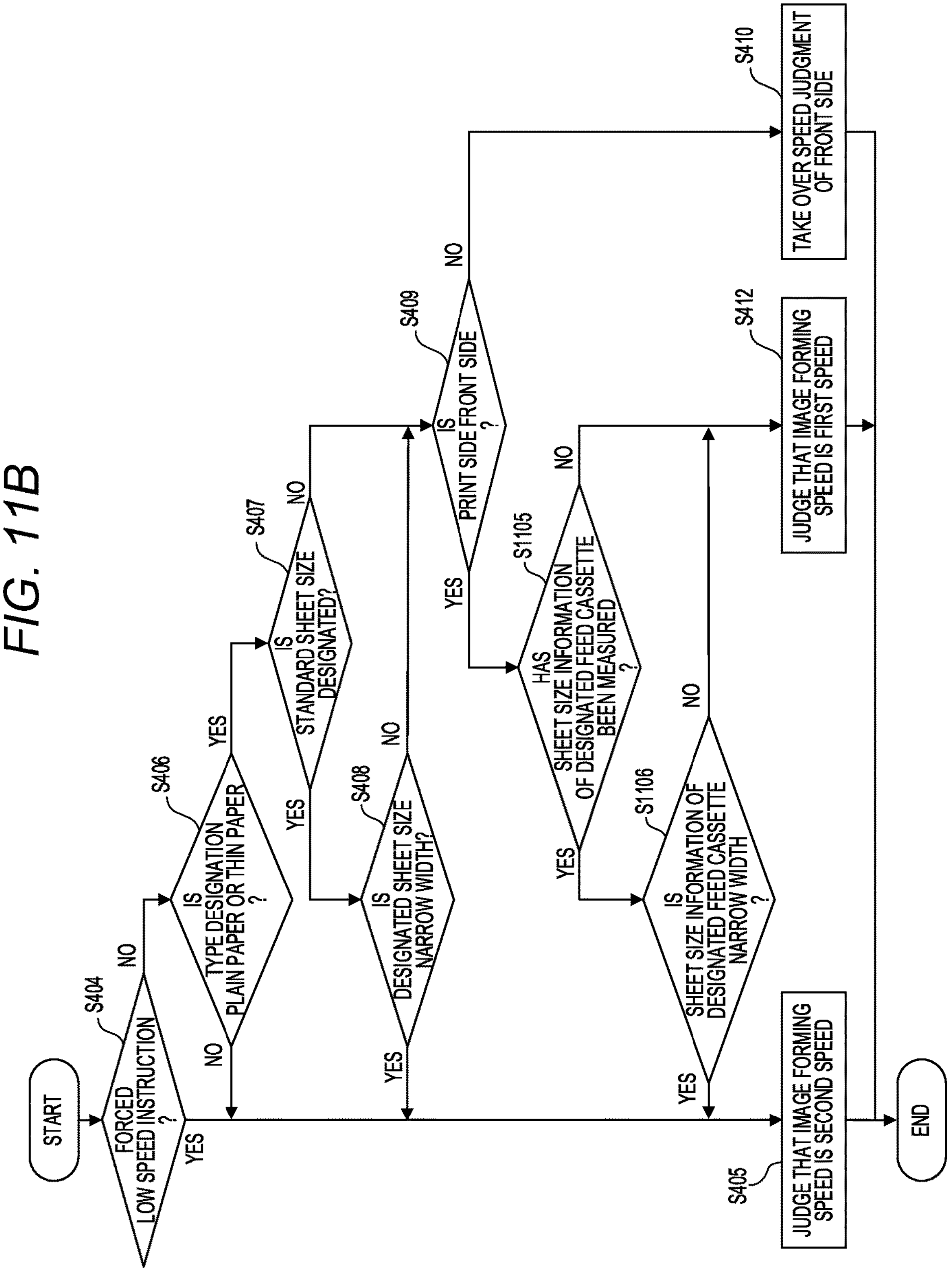
FIG. 11B is a flow chart of processing to be performed by a printing speed judgment portion according to one or more aspect of the present disclosure.

FIG. 11A and FIG. 11B are judgment flow charts in the third embodiment. FIG. 11A is a flow chart of the pre-start execution judgment portion 302. In S1100, the pre-start execution judgment portion 302 judges whether or not any of the feed cassettes have the recording material. That is, the pre-start execution judgment portion 302 judges, based on the detection results of the cassette presence/absence detector 312 and the second cassette presence/absence detector 1001, whether or not any one or more of the feed cassettes have the recording material P. In a case in which the pre-start execution judgment portion 302 judges that none of the cassettes have the recording material or the feed cassette is absent in S1100, the pre-start execution judgment portion 302 advances the process to S1101. In S1101, the pre-start execution judgment portion 302 judges not to execute the pre-start, and ends the processing. In a case in which the pre-start execution judgment portion 302 judges that any one or more of the feed cassettes have the recording material P in S1100, the pre-start execution judgment portion 302 advances the process to S1102.

In S1102, the pre-start execution judgment portion 302 judges whether or not there is a feed cassette of which a sheet size has not been measured by the size detector 310 (hereinafter referred to as "sheet size unmeasured feed cassette"). In a case in which the pre-start execution judgment portion 302 judges that there is a sheet size unmeasured feed cassette in S1102, the pre-start execution judgment portion 302 advances the process to S1103. In a case in which the pre-start execution judgment portion 302 judges that there is no sheet size unmeasured feed cassette in S1102, the pre-start execution judgment portion 302 advances the process to S1104. In S1103, the pre-start execution judgment portion 302 judges to execute the pre-start, and ends the processing. In S1104, the pre-start execution judgment portion 302 judges whether or not the sheet size information for all measured (confirmed) feed cassettes is the narrow width. When the pre-start execution judgment portion 302 judges that the sheet size information for all measured feed cassettes is the narrow width in S1104, the pre-start execution judgment portion 302 advances the process to S101. In S1101, the pre-start execution judgment portion 302 judges not to execute the pre-start, and ends the processing. In a case in which the pre-start execution judgment portion 302 judges that there is at least one feed cassette having the sheet size information of the wide width in S1104, the pre-start execution judgment portion 302 advances the process to S1103. In S1103, the pre-start execution judgment portion 302 judges to execute the pre-start, and ends the processing.

(Printing Speed Judgment Processing)

FIG. 11B is a flow chart of the printing speed judgment portion 308. The same processes as those in the control flow chart of FIG. 4B are denoted by the same step numbers (S404 to S410, and S412), and description thereof is omitted. In a case in which the printing speed judgment portion 308 judges that the print side is the front side in S409, the printing speed judgment portion 308 performs the process of S1105. That is, in a case in which no forced low speed instruction is given from the image controller 301, the type designation of the recording material P is plain paper or thin paper, a non-standard size is designated or the designated sheet size is wide width standard paper, and the print side is the front side, the following process is performed. In S1105, the printing speed judgment portion 308 refers to the sheet size information of the feed cassette designated from the image controller 301, and judges whether or not the sheet size has been measured by the size detector 310. In a case in which the printing speed judgment portion 308 judges that the sheet size has not been measured in S1105, the printing speed judgment portion 308 advances the process to S412. In S412, the printing speed judgment portion 308 judges that the image forming speed is the first speed assuming that the recording material P having the wide width is set in the designated feed cassette, and ends the processing.

In a case in which the printing speed judgment portion 308 judges that the sheet size has been measured in S1105, the printing speed judgment portion 308 advances the process to S1106. In S1106, the printing speed judgment portion 308 refers to the sheet size information of the designated feed cassette, and judges whether or not the sheet size information is the narrow width. In a case in which the printing speed judgment portion 308 judges that the sheet size information is the wide width in S1106, the printing speed judgment portion 308 advances the process to S412. In S412, the printing speed judgment portion 308 judges that the image forming speed is the first speed, and ends the processing. In a case in which the printing speed judgment portion 308 judges that the sheet size information is the narrow width in S1106, the printing speed judgment portion 308 advances the process to S405. In S405, the printing speed judgment portion 308 judges that the image forming speed is the second speed, and ends the processing.

In the third embodiment, judgment is made by combining the flow charts of FIG. 11A and FIG. 11B. Thus, even in the image forming apparatus including the plurality of feed cassettes, whether or not to execute the pre-start can be judged at the timing of the pre-start instruction if possible. Then, the pre-start execution judgment portion 302 can suitably perform the judgment of the pre-start. In the third embodiment, the recording material width detection mechanism judges the recording material width with respect to all of the feed cassettes by the recording material width sensor on the conveyance path. However, as in the second embodiment, the feed cassette including the position sensor being the regulation plate of the feed cassette may be used, and the position sensor of the feed cassette may be used for the judgment of the sheet size of the feed cassette.

As described above, according to the third embodiment, in the image forming apparatus having the plurality of image forming speeds, the occurrence of the switching operation of the image forming speed is suppressed while the first print out time is reduced, thereby being capable of suppressing the increase of the first print out time and the progress of the life of the consumable item.

According to the present disclosure, in the image forming apparatus having the plurality of image forming speeds, the occurrence of the switching operation of the image forming speed is suppressed while the first print out time is reduced, thereby being capable of suppressing the increase of the first print out time and progress of the life of the consumable item.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-211243, filed Dec. 21, 2020 which is hereby incorporated by reference herein in its entirety.

What is claimed is:

1. An image forming apparatus, comprising:

a container unit configured to contain a recording material;

an image forming unit configured to perform image formation onto the recording material conveyed from the container unit;

a motor configured to drive the image forming unit;

a control unit configured to be able to perform a preparatory operation for preparing the image formation by operating the image forming unit in a state in which the image forming unit is driven at a first speed by the motor; and a first detection unit configured to detect a size of the recording material contained in the container unit, wherein the control unit is configured to be able to drive the image forming unit at the first speed and a second speed lower than the first speed, wherein, in a case in which the control unit determines, before receiving a print signal, that a length of the recording material in a width direction orthogonal to a conveyance direction is equal to or larger than a first width by the first detection unit, the control unit executes the preparatory operation while driving the image forming unit at the first speed, and wherein, in a case in which the control unit determines, before receiving the print signal, that the length of the recording material in the width direction is smaller than the first width by the first detection unit, the control unit drives the image forming unit at the second speed and after receiving the print signal, performs the preparatory operation.

2. The image forming apparatus according to claim 1, wherein the control unit is configured to determine the image forming speed at which the image formation is performed in accordance with the size of the recording material detected by the first detection unit.

3. The image forming apparatus according to claim 1, wherein, in a case in which the width of the recording material is not detected by the first detection unit, the control unit judges to execute the preparatory operation assuming that the width of the recording material is equal to or larger than the first width.

4. The image forming apparatus according to claim 3, wherein, in the case in which the width of the recording material is not detected by the first detection unit, the control unit determines the image forming speed as a first speed.

5. The image forming apparatus according to claim 1, wherein the container unit includes a plurality of container units, wherein the image forming apparatus further comprises a second detection unit configured to detect whether each of the plurality of container units contains the recording material, wherein the first detection unit is configured to detect the size of the recording material contained in each of the plurality of container units, and wherein, in a case in which the control unit judges that the recording material is not contained in any of the plurality of container units based on a detection result of the second detection unit, the control unit judges not to execute the preparatory operation.

6. The image forming apparatus according to claim 5, wherein, in a case in which the width of the recording material contained in, among the plurality of container units, a container unit designated for the image formation is equal to or larger than the first width, the control unit determines the image forming speed as a first speed, and, in a case in which the width of the recording material contained in the designated container unit is smaller than the first width, the control unit determines the image forming speed as a second speed different from the first speed.

7. The image forming apparatus according to claim 5, wherein, in a case in which there is, among the plurality of container units, a container unit in which the width of the recording material is not detected, the control unit judges to execute the preparatory operation assuming that the width of the recording material is equal to or larger than the first width.

* * * * *